United States Patent
Camilli et al.

(10) Patent No.: US 8,340,526 B2
(45) Date of Patent: Dec. 25, 2012

(54) FIBER OPTIC OBSERVATORY LINK FOR MEDIUM BANDWIDTH DATA COMMUNICATION

(75) Inventors: Richard Camilli, Woods Hole, MA (US); Frederick Sonnichsen, East Falmouth, MA (US); Albert M. Bradley, North Falmouth, MA (US); Steven A. Lerner, Falmouth, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 321 days.

(21) Appl. No.: 12/832,854

(22) Filed: Jul. 8, 2010

(65) Prior Publication Data

US 2011/0058814 A1    Mar. 10, 2011

Related U.S. Application Data

(60) Provisional application No. 61/223,876, filed on Jul. 8, 2009.

(51) Int. Cl.
*H04B 13/02* (2006.01)
(52) U.S. Cl. ........ 398/104; 398/105; 398/173; 398/180; 455/40; 455/41.1
(58) Field of Classification Search .................. 398/104, 398/105, 173, 180; 455/40, 40.1
See application file for complete search history.

(56) References Cited

U.S. PATENT DOCUMENTS

| | | | | |
|---|---|---|---|---|
| 5,007,697 A | * | 4/1991 | Chadha | 385/24 |
| 5,526,157 A | * | 6/1996 | Kawano | 398/1 |
| 6,808,021 B2 | * | 10/2004 | Zimmerman et al. | 166/381 |
| 7,921,916 B2 | * | 4/2011 | Lovell et al. | 166/336 |
| 8,219,024 B2 | * | 7/2012 | Rhodes et al. | 455/40 |
| 2008/0037987 A1 | * | 2/2008 | Bradley et al. | 398/59 |
| 2008/0171512 A1 | * | 7/2008 | Jack et al. | 455/41.1 |
| 2008/0236837 A1 | * | 10/2008 | Lovell et al. | 166/336 |
| 2010/0183313 A1 | * | 7/2010 | Rhodes et al. | 398/104 |

* cited by examiner

*Primary Examiner* — Li Liu
(74) *Attorney, Agent, or Firm* — Ropes & Gray LLP

(57) ABSTRACT

Systems and methods for a reconfigurable, long-range, underwater data-communication network are described. The network provides a low cost, low power, lightweight, and easy to deploy underwater communication system capable of being operated at long distances. The network may include a cabled ocean observatory, which may be deployed underwater and connected to a surface buoy. The cabled ocean observatory may be connected to one or more removable underwater sensors via fiber optic cables. The underwater sensors may be disposed at underwater locations at long distances from the cabled ocean observatory. Fiber optic extension modules may be permanently connected to each end of the fiber optic cables. Each fiber optic extension module may include an optical transceiver, a power supply, and an inductive element for removably coupling an underwater sensor or the cabled ocean observatory to the fiber optic cable.

23 Claims, 7 Drawing Sheets

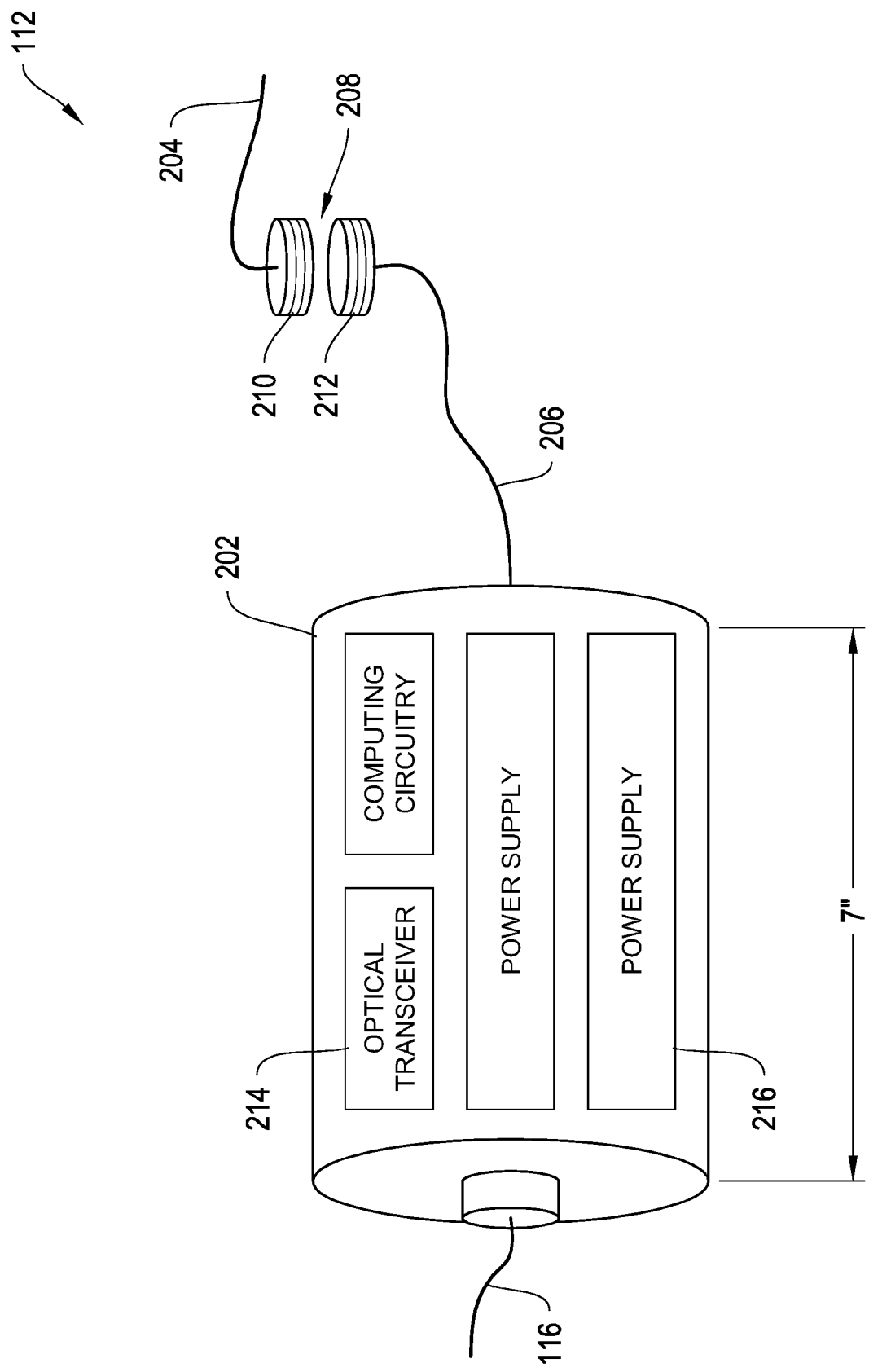

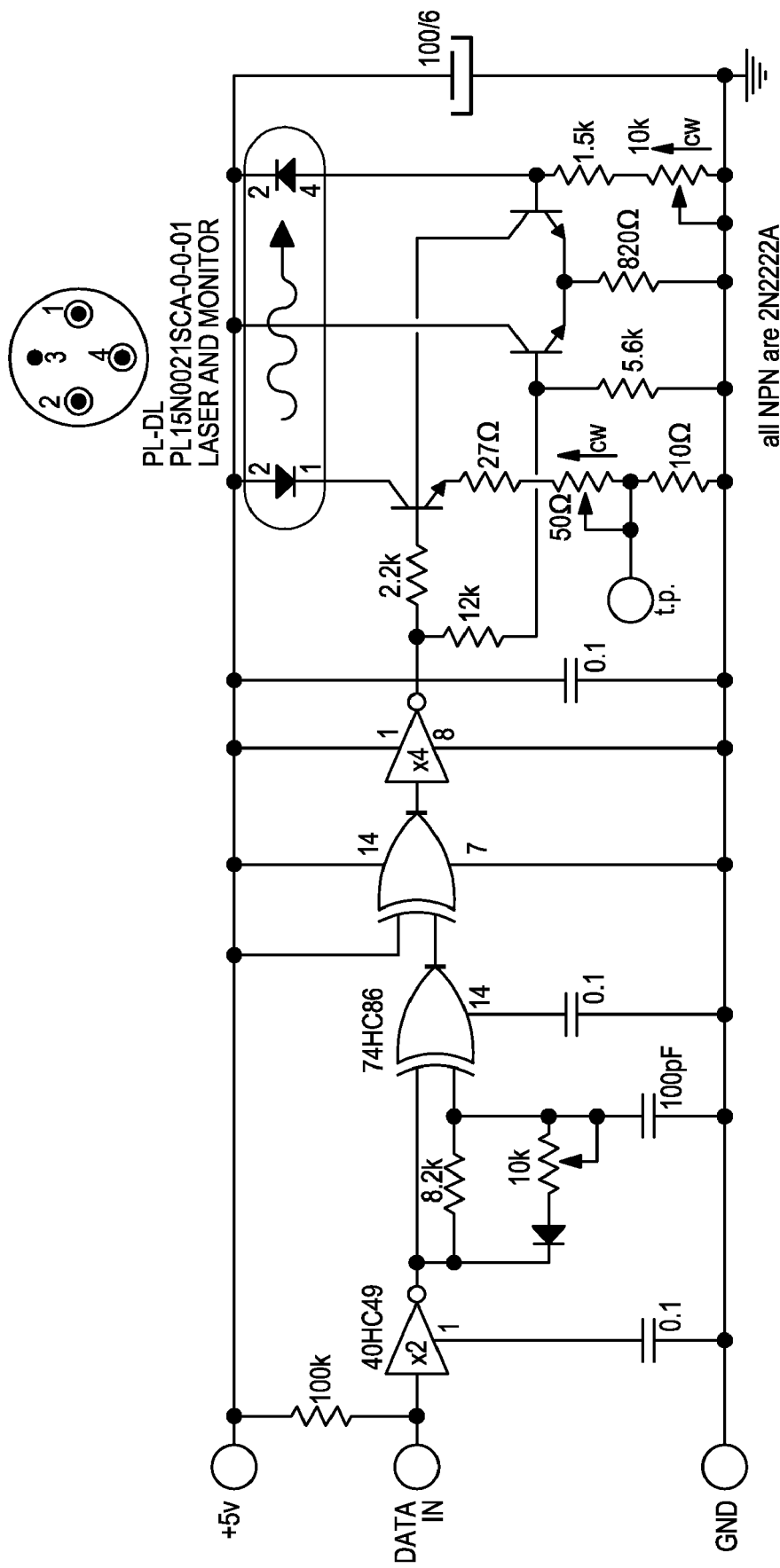
FIGURE 3 (part 1)

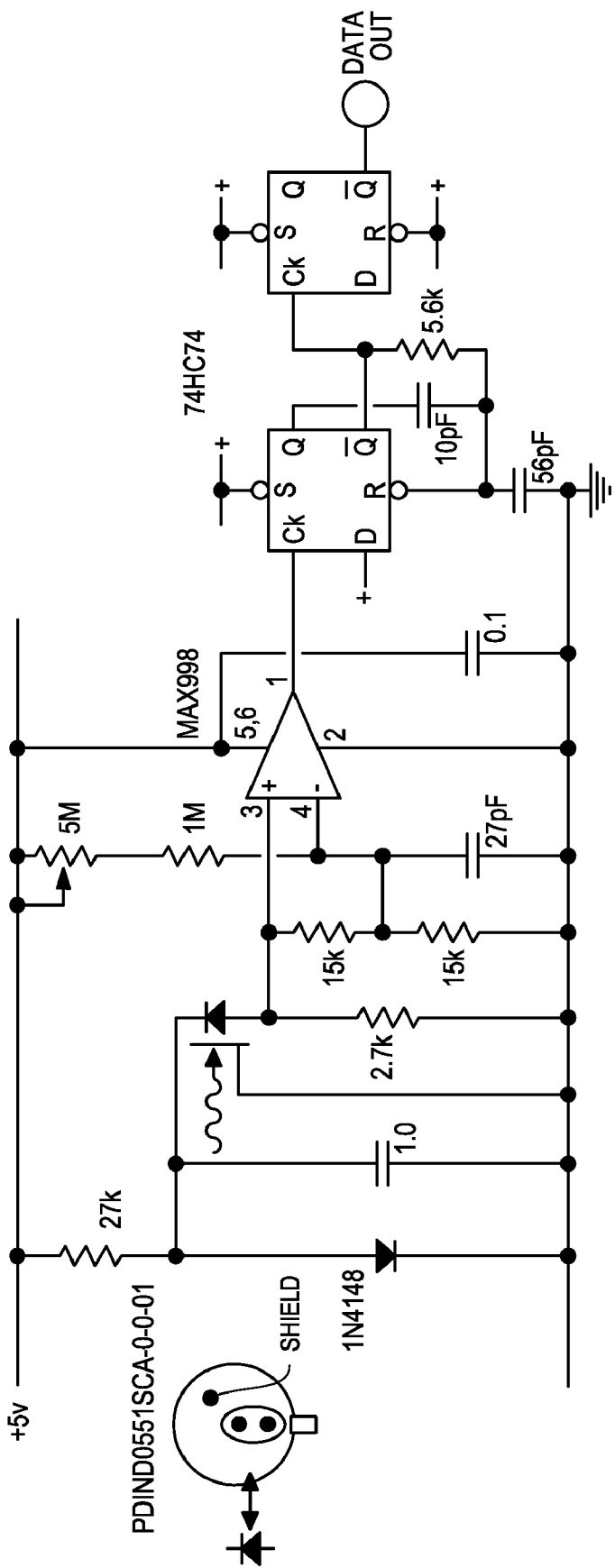
FIGURE 3 (part 2)

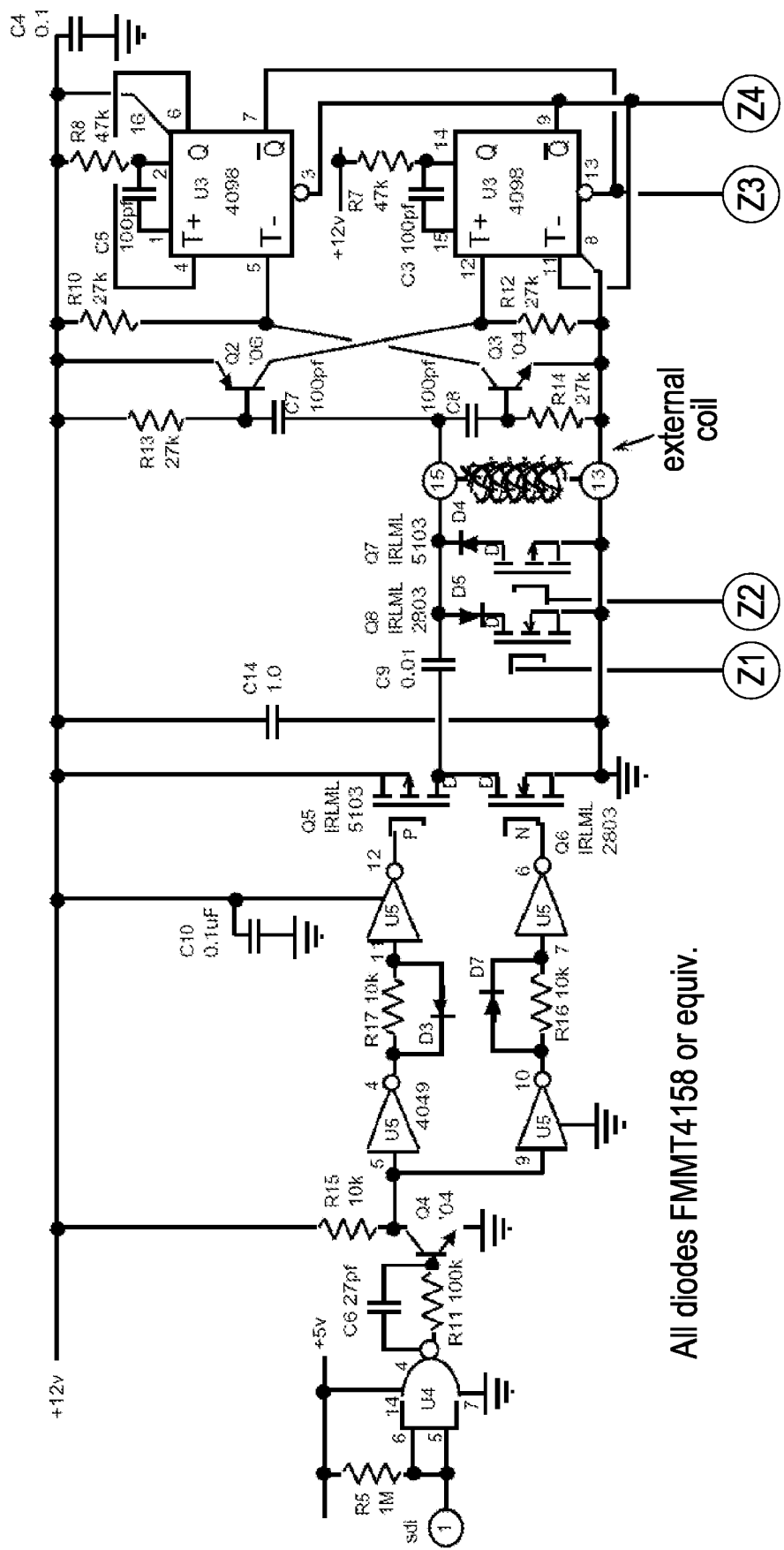
FIGURE 4 (part 1)

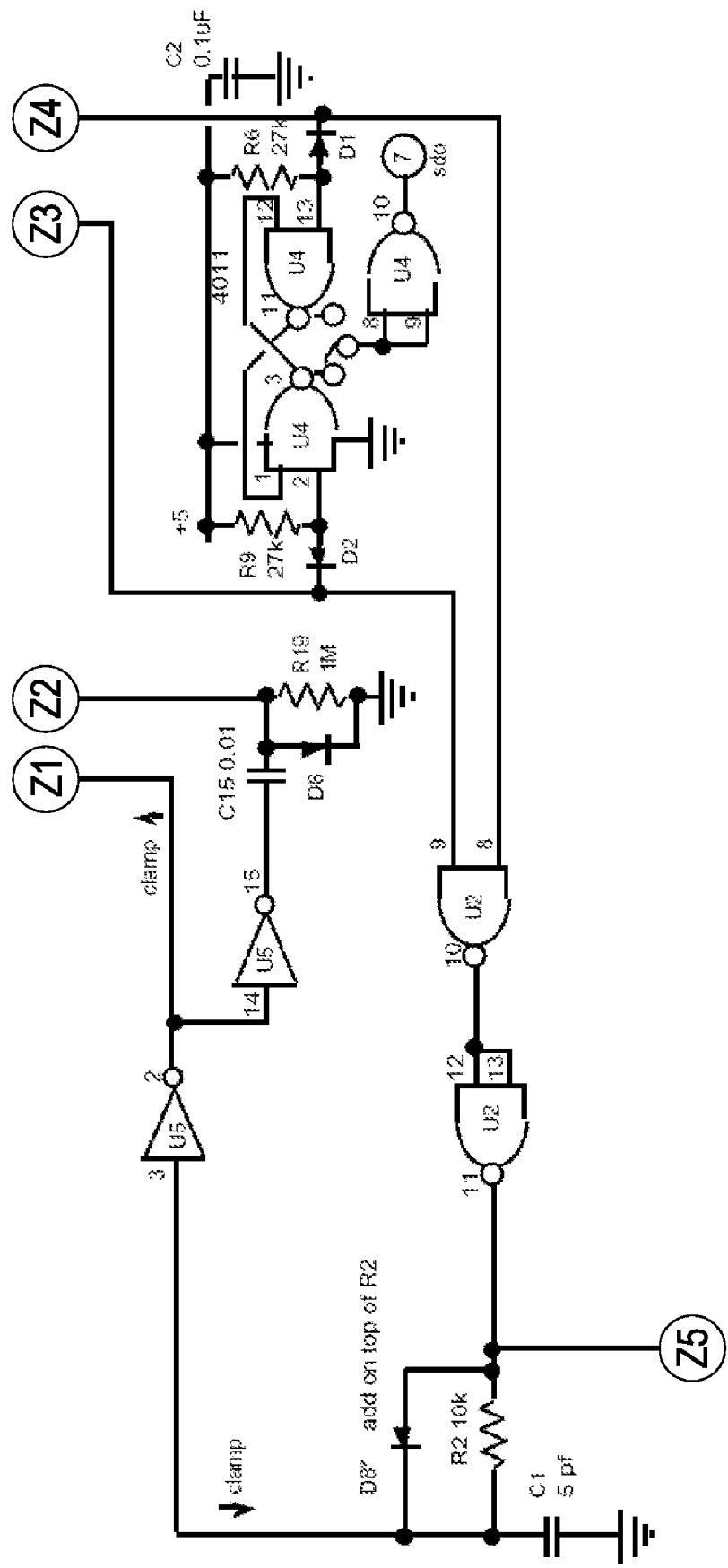
FIGURE 4 (part 2)

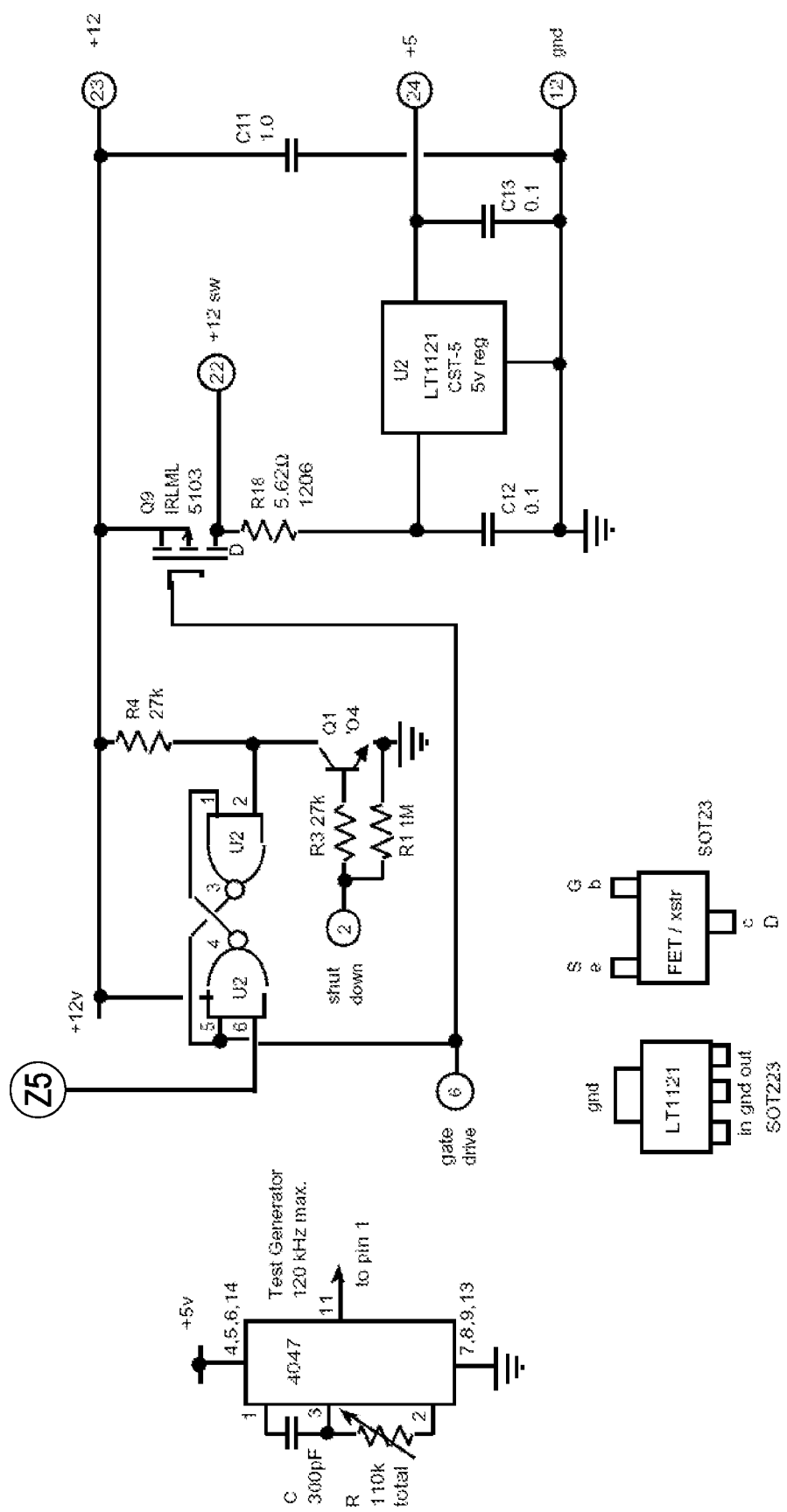
FIGURE 4 (part 3)

FIBER OPTIC OBSERVATORY LINK FOR MEDIUM BANDWIDTH DATA COMMUNICATION

CROSS-REFERENCE TO RELATED APPLICATIONS

This application claims priority to and the benefit of U.S. Provisional Patent Application Ser. No. 61/223,876, filed Jul. 8, 2009 and entitled "Fiber Optic Observatory Link For Medium Bandwidth Data Communication", the entire contents of which are incorporated herein by reference.

BACKGROUND OF THE INVENTION

There is an increasing need for long term observation of large portions of the earth-ocean system. In particular, scientists wish to monitor oceanic processes as well as improve predictive modeling of complex natural phenomena that vary over distance and time. Ocean observatories are being deployed at the seafloor and connected by cable or buoy to surface networks to help scientists study these oceanic processes. These observatories are really large computer and power networks having scientific equipment such as spectrometers or seismometers. These seafloor observatories may be located many hundreds of kilometers off the coast of the nearest shore station and may be positioned at depths of over 5000 meters. Typically, the observatory has one or more network connections to shore stations through which data collected from the seafloor observatory can be passed onto the Internet and which can serve seafloor instruments with power and control commands. Although existing and proposed observatory systems promise high electrical power and real-time communications, they have severe limitations with regard to the distance that instrumentation can be deployed from the observatory (either coastal, regional, or buoys) due to power, communications, and cost constraints. In addition these devices are large, heavy, and deployment is cumbersome and costly, often requiring an ROV.

Accordingly, there is a need for a low cost, low power, lightweight, and easy to deploy underwater communication system capable of being operated at long distances.

SUMMARY OF THE INVENTION

The systems and methods described herein provide a reconfigurable, long-range, underwater data-communication network. In particular, the network provides a low cost, low power, lightweight, and easy to deploy underwater communication system capable of being operated at long distances.

In one aspect, a reconfigurable, long-range, underwater data-communication network may include a cabled ocean observatory, which may be deployed underwater and connected to a surface buoy. The cabled ocean observatory may be connected to one or more removable underwater sensors via fiber optic cables. The underwater sensors may be disposed at underwater locations at long distances from the cabled ocean observatory. Fiber optic extension modules may be permanently connected to each end of the fiber optic cables. Each fiber optic extension module may include an optical transceiver, a power supply, and an inductive element for removably coupling an underwater sensor or the cabled ocean observatory to the fiber optic cable.

In some embodiments, each fiber optic extension module may include a first inductive element and each removable underwater sensor may include a second inductive element. The first inductive element may be coupled with the second inductive element. In some embodiments, each fiber optic extension module may include a first inductive element and the cabled observatory may include a third inductive element. The first inductive element may be coupled with the third inductive element. In some embodiments, parasitic power generated at the underwater sensor may be inductively transferred to the fiber optic extension module via the inductive coupling. In some embodiments, underwater sensors may be connected together in a daisy-chain configuration such that each connection includes additional fiber optic cable and an additional fiber optic extension module at each end of the additional cable.

In some embodiments, the optical transceiver of the fiber optic extension module may include a laser configured to operate such that the module has a total power consumption of less than about 1 W when transmitting data at distances of over 100 km at about 9600 baud. In some embodiments, the laser may be configured to transmit data using an on-off keying protocol. In some embodiments, the optical transceiver may minimize power consumption by operating only when a detector receives optical signals. In some embodiments, the fiber optic extension module may be enclosed in a waterproof housing. In some embodiments, the fiber optic extension module may include one or more LiH batteries as power supplies. In some embodiments, the fiber optic extension module may weigh less than about 20 kg. In some embodiments, the fiber optic extension modules may be arranged in a mesh architecture, a bus architecture, a ring architecture, or a star architecture.

In some embodiments, the fiber optic cable may be configured with separate data channels carrying data packets, and control and time channels for carrying control and time signals. The control and time signals may transmitted separate from the data packets. In some embodiments, the fiber optic extension module may include an out-of-band communication module for detecting the control and time signals. The out-of-band communication module may be coupled to the fiber optic cable. It may further provide distribution of in-band data packets and out-of-band control and time signals among the network.

In some embodiments, the network may include means for measuring transmission latency among the plurality of fiber optic extension modules. In some embodiments, the fiber optic extension module may include a control module for regulating flow of the control and time signals across the control and time channels in the fiber optic cable. In some embodiments, the control module may include an interface controller for selectively allowing data channels internal to the fiber optic extension module to access control and time channels carrying control and time signals among the different fiber optic extension modules in the network.

In another aspect, an underwater communication network may include a cabled ocean observatory, one or more removable underwater sensor, and one or more fiber optic cables having a fiber optic extension module at each end. The removable underwater sensor may be disposed at an underwater location at a long distance from the cabled ocean observatory. The fiber optic extension module may be inductively coupled to the cabled ocean observatory and the removable sensor. The sensor may send serial data across an inductive coupling to the fiber optic extension module. An optical transceiver in the fiber optic extension module may modulate based on the received data. The modulation may be accomplished by operating a laser in the optical transceiver using an on-off keying protocol. The fiber optic extension module may send the modulated optical signals across the fiber optic cable to another fiber optic extension module. The other fiber optic extension module may receive and convert the modulated optical signal to serial data. The other fiber optic extension module may send the received serial data across an inductive coupling to the cabled observatory.

BRIEF DESCRIPTION OF THE FIGURES

The foregoing and other objects and advantages of the invention will be appreciated more fully from the following further descriptions thereof, with reference to the accompanying drawings wherein.

FIG. 2 depicts a fiber optic extension module, according to an illustrative embodiment of the invention.

FIG. 3 depicts a driver circuit for a laser source in a fiber optic extension module, according to an illustrative embodiment of the invention.

FIG. 4 depicts an inductive coupling system and a signaling system for a subsea inductive modem, according to an illustrative embodiment of the invention.

DETAILED DESCRIPTION OF THE INVENTION

Figure 1:
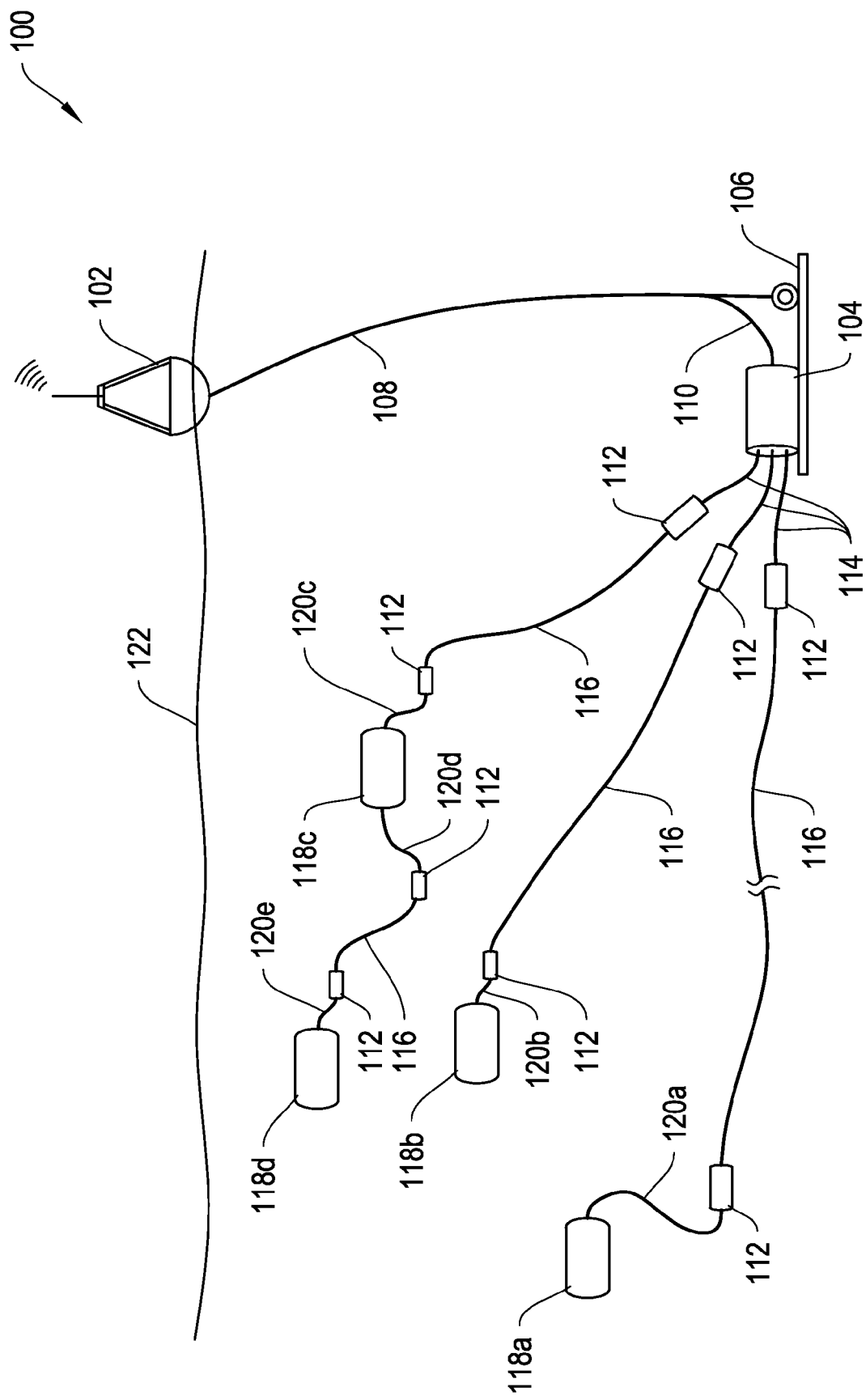
FIG. 1 depicts a long range subsea sensor and communication network, according to an illustrative embodiment of the invention.

The systems and methods described herein will now be described with reference to certain illustrative embodiments. However, the invention is not to be limited to these illustrated embodiments which are provided merely for the purpose of describing the systems and methods of the invention and are not to be understood as limiting in anyway.

FIG. 1 depicts a long range subsea sensor and communication network 100, according to an illustrative embodiment of the invention. System 100 includes a cabled ocean observatory 104 submerged under a water body 122 at a desired depth. A cabled ocean observatory may be designed around either a surface buoy containing an autonomous power source and wireless (e.g., satellite) communications link or a submarine fiber optic/power cable connecting one or more seafloor science nodes to the terrestrial power grid and communications backhaul. A cabled ocean observatory may provide unprecedented amounts of power and two-way bandwidth to access and control instrument networks and platforms in the ocean. The cabled ocean observatory 104 is attached to a surface buoy 102. The surface buoy 102 may remain floating on the surface of the water. A high capability buoy may contain diesel generators that deliver up to 1 kW of power. A cable 108 extending from the buoy is attached to submerged platform 106.

During operation, the observatory 104 may be disposed on the submerged platform 106 and lowered to a desired depth. The system 100 includes a plurality of underwater sensors 118a-118d disposed or scattered at various locations underwater. The underwater sensors may include a temperature sensor, a pressure sensor, a motion sensor, a light sensor, a video camera, or any other suitable type of sensor. The underwater sensors 118a-118d are connected to the cabled ocean observatory 104 by fiber optic cable 116. Fiber optic cable may be advantageous over, for example, copper cable, since signals travel along them with less loss and are immune to electromagnetic interference. Fiber optic cable may be easier to deploy underwater due to lighter weight. However, the fiber optic cable may require protective covering capable of guarding against corrosion and damage from, e.g., fish bites. The fiber optic cable may be surrounded by a protective jacket layer made of, for example, plastic. The fiber optic cable 116 may extend for distances greater than 50 km. In certain embodiments, the fiber optic cable 116 may extend for distances greater than 100 km. The fiber optic cable 116 may extend for distances greater than 200 km. The fiber optic cable 116 may include a bundle of a plurality fiber optic wires.

System 100 includes a plurality of fiber optic extension modules 112. Generally, the fiber optic module 112 interfaces the fiber optic cable 116 with one or more observatories, sensors, devices or vehicles. In the illustrated embodiment, module 112 connects the observatory 104 to the fiber optic cable 116. Particularly, the observatory 104 may include one or more electrical cables 114 extending in one or more different directions. The electrical cables 114 may interface with the electronics housed in the observatory 104. The electrical cables 114 may interface with the fiber optic cable through module 112. The module 112 will be described in more detail with reference to FIG. 2. The electrical cables 114 may also interface with electronics and other equipment located on the surface of the water. For example, the electrical cables 114 may be connected to the surface buoy 102 through the wire 110 that connects the buoy 102 and the observatory 104. In some embodiments, one or more of the plurality of underwater sensors may be removable. One or more of the underwater sensors 118a-118d may be inductively coupled with ocean observatory 104 via inductive elements in modules 112, requiring no connectors. The inductive coupling system will be described in more detail with reference to FIG. 4.

The module 112 may also connect the fiber optic cable 116 to the underwater sensors 118a-118d. As depicted, underwater sensor 118a includes an electrical cable 120a that interfaces with the module 112 and fiber optic cable 116 to allow the underwater sensor 118a to communicate over long distances with the observatory 104. Similarly, sensor 118b connects via electrical cable 120b, modules 112 and fiber optic cable 116 to the observatory 104. In certain embodiments, underwater sensors 118a and 118b may be located on opposite sides of the cabled ocean observatory and may be separated by a distance from about 100 km to about 400 km. In certain embodiments, underwater sensors 118a and 118b may be separated by a distance of less than 100 km. The underwater sensors 118a-118d may be separated by even greater distances by daisy-chaining a plurality of sensors to extend their range. For example, sensor 118d may be connected to sensor 118c, which in turn may be connected to observatory 104. Fiber optic cable 116 may connect sensor 118d with sensor 118c via modules 112. The modules 112 may be arranged in a mesh architecture, a bus architecture, a ring architecture, a star architecture, or any other suitable type of architecture.

FIG. 2 depicts a fiber optic extension module 112, according to an illustrative embodiment of the invention. In particular, module 112 connects an electrical cable 204 from a sensor, observatory or other device to a fiber optic cable 116. In some embodiments, the fiber optic cable 116 is permanently connected to the fiber optic extension module 112. The permanent connection may be made using, for example, epoxy or some other adhesive. The connection may be designed with the intention of infrequent disconnection of the fiber optic cable 116 from the fiber optic extension module 112. The module 112 may includes electrical wiring 206 and an inductively coupled modem 208 having inductive coils 210 and 212. The module 112 includes an optical transceiver and other electronics 214, and one or more power supply units 216. In some embodiments, power supply units 216 may include LiH batteries. The optical transceiver 214 is configured for transmitting and receiving data as optical signals over an optic channel. The optical transceiver 214 may be configured as an out-of-band communications module for coupling to the fiber optic cable 116. In particular, the optical transceiver 214 may be configured for transmitting and receiving control and time signals out of band and separately from data packets that may be transmitted or received in-band. The optical transceiver 214 may allow for accessing principle in-band data communication modules and power modules in a distributed network of devices, independent of the proper function of those principle modules.

Generally, the fiber optic extension module 112 allows for accessing the sensors 118 in the network via their primitive, typically low data rate, access methods and protocols and employ a minimal suite of simple equipment for the out-of-band system. Additionally and optionally, the fiber optic extension module 112 may provide for low power consumption permitting operation on auxiliary power such as a battery during malfunction of the power system. For example, module 112 may include a wake-up circuit (or detector) for causing the device to enter into an active state in response to an incoming signal. The module 112 may be configured to switch into a state of low or zero power consumption according to a timed prearrangement or by lack of incoming signals, unless an optical signal is detected. A suitable out-of-band communication module for use with the extension module 112 and optical transceiver 214 is, for example, described in commonly-owned U.S. patent application Ser. No. 11/702,851, entitled "Communication/Power Network Having Out-Of-Band Time and Control Signaling," the entire contents of which are incorporated herein by reference.

In some embodiments, system 100 may include means for measuring transmission latency among the plurality of fiber optic extension modules. System 100 may further include a time distribution system for synchronizing clocks within the modules 112 in response to a timing pulse transmitted over the optical channel. Modules 112 may include a clock sync update logic board capable of adjusting the clock sync signal to take into consideration the latency that arises from the transfer of the sync signal across the multiple meters that make up the out-of-band communication fiber length. In some embodiments, module 112 may include a control module for regulating flow of the control and time signals across the control and time channels in the fiber optic cable 116. In some embodiments, the control module may include an interface controller for selectively allowing data channels internal to module 112 to access control and time channels carrying control and time signals among modules 112.

In some embodiments, a fiber optic extension module is connected to a 10 km link provided by a fiber optic cable operating at 9600 baud to 56 kbps. The module is independently powered by Lithium cells, and utilizes a low power sleep/wakeup circuit. The module includes 3 mW lasers with reliable transmission over 100 km. Data connections to the module are made via inductive coupling through an inductive modem. The module weighs 20 kg requiring only a small boat or a scuba diver for deployment.

FIG. 3 depicts a driver circuit for a laser source in a fiber optic extension module, according to an illustrative embodiment of the invention. In some embodiments, the optical transceiver 214 may include a laser source (e.g., a laser diode) configured to operate such that module 112 has a total power consumption of less than about 1 W when transmitting data at distances of over 100 km at about 9600 baud. In some embodiments, the laser diode may consume less than about 3 mW of power while transmitting reliability over 100 km. In some embodiments, the laser diode may be configured to transmit data using an on-off keying protocol. The on-off keying of the laser diode allows for omitting a constant carrier on the laser source. By removing this constant carrier, the amount of power consumed by the laser diode may be substantially reduced. This may reduce the available bandwidth of the laser. In some embodiments, the available bandwidth may be limited to about 1 Mbps. However, by removing the constant carrier, the feedback mechanism normally employed for laser power regulation may be removed. To address this, a configuration of an op-amp in the circuit may be established. The depicted circuit allows power regulation without a constant carrier. Laser power may be regulated through feedback control, allowing for power regulation for the depicted system that does not employ a constant carrier.

FIG. 4 depicts an inductive coupling system and a signaling system for a subsea inductive modem, according to an illustrative embodiment of the invention. A fiber optic extension module may include an inductively coupled modem having one or more inductive coils or elements. The underwater sensors and the cabled ocean observatory may include one or more inductive coils to be coupled with the fiber optic extension module. The underwater sensors or the cabled ocean observatory may be connected to the fiber optic extension modules via an inductive modem to allow for easy removal of the sensor by a diver when required. Inductive modems inherently provide data transfer without physically contact, thus avoiding the need for expensive underwater pluggable electrical/optical connectors. Using a conventional underwater connector may require a shutdown in order to reconfigure the module. However, the non-contact inductive method may further permit efficient reconfiguration of the module without shutting it down. In some embodiments, the inductive coils or elements may be configured to recharge the system 100. The inductive modem may transfer parasitic power generated at the underwater sensor to the fiber optic extension module. Power may be transferred while allowing the inductive modem to simultaneously operate in communications mode. The parasitic power may used to charge batteries in the fiber optic extension module, allowing for long-term use without battery replacement.

Although, described with reference to underwater sensors 118*a*-118*d*, it should be noted that system 100 may be used in conjunction with any and all types of sensors, underwater vehicles such as ROVs and AUVs, cabled or tethered observatories, devices buried under the sea bed, tools and logging devices used under water and under the surface of the seabed such as ROTs. Examples of suitable sensors, ROVs, and AUVs may be found in commonly-owned U.S. patent application Ser. No. 11/796,874, entitled "Systems And Methods For Analyzing Underwater, Subsurface And Atmospheric Environments", Ser. No. 11/348,726, entitled "Systems And Methods For Underwater Optical Communication", and Ser. No. 12/148,226, entitled "Systems And Methods For Tethering Underwater Vehicles", the entire contents of which are incorporated herein by reference.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

The invention claimed is:

1. A reconfigurable, long-range, underwater data-communication network comprising,
    a cabled ocean observatory, deployed underwater and connected to a surface buoy,
    a plurality of removable underwater sensors, disposed at underwater locations at distances greater than 10 km from the cabled ocean observatory;

a plurality of fiber optic cables, having a protective covering capable of guarding against corrosion and damage, for linking the cabled ocean observatory to the plurality of underwater sensors, wherein each fiber optic cable is at least 10 km long; and a plurality of fiber optic extension modules, including a first module and a second module, each module permanently connected to one end of each of the plurality of fiber optic cables, and each module comprising an optical transceiver, and a power supply, wherein the first module includes a first inductive unit for removably coupling a first one of the plurality of sensors to a first one of the fiber optic cables, and wherein the second module includes a second inductive unit for removably coupling the cabled ocean observatory to the first one of the fiber optic cables.

2. The underwater communication network of claim 1, wherein the first inductive unit includes a first inductive element at the first module, and a second inductive element at the first one of the plurality of sensors, and the first inductive element is coupled with the second inductive element.

3. The underwater communication network of claim 1, wherein the second inductive unit includes a first inductive element at the second module, and a second inductive element at the cabled ocean observatory, and the first inductive element is coupled with the second inductive element.

4. The underwater communication network of claim 1, wherein the optical transceiver includes a laser configured to operate such that the fiber optic extension module has a total power consumption of less than about 1 W when transmitting data at distances of over 100 km at about 9600 baud.

5. The underwater communication network of claim 4, wherein the laser is configured to transmit data using an on-off keying protocol.

6. The underwater communication network of claim 1, wherein the optical transceiver is configured with a detector to operate only when optical signals are received thereby minimizing power consumption.

7. The underwater communication network of claim 1, wherein a waterproof housing encloses each of the plurality of fiber optic extension modules.

8. The underwater communication network of claim 1, wherein the power supply includes one or more LiH batteries.

9. The underwater communication network of claim 1, wherein the first inductive unit allows for inductively supplying power to the first module, whereby parasitic power generated at the first one of the plurality of sensors is inductively transferred to the first module.

10. The underwater communication network of claim 1, further comprising connecting one or more of the plurality of underwater sensors together in a daisy-chain configuration such that each connection includes additional fiber optic cable and an additional fiber optic extension module at each end of the additional cable.

11. The underwater communication network of claim 1, wherein each fiber optic cable comprises data channels for carrying data packets and one or more control and time channels for carrying control and time signals among the plurality of fiber optic extension modules, and each fiber optic extension module further comprises an out-of-band communication module for coupling to each end of the plurality of fiber optic cables to utilize the control and time signals transmitted separately from the data packets.

12. The underwater communication network of claim 11, wherein the out-of-band communication module further comprises a control module for regulating flow of the control and time signals across the one or more control and time channels.

13. The underwater communication network of claim 12, further comprising means for measuring transmission latency among the plurality of fiber optic extension modules.

14. The underwater communication network of claim 12, wherein the control module further comprises an interface controller for selectively allowing a plurality of data channels internal to each fiber optic extension module to access the one or more control and time channels carrying control and time signals among the plurality of fiber optic extension modules.

15. The underwater communication network of claim 1, wherein the plurality of fiber optic extension modules are arranged in an architecture selected from the group consisting of a mesh architecture, a bus architecture, a ring architecture, or a star architecture.

16. The underwater communication network of claim 1, wherein each fiber optic extension module weighs less than about 20 kg.

17. A method for long-range underwater communication, comprising providing an underwater communication network, including a cabled ocean observatory, at least one removable underwater sensor, disposed at an underwater location at a distance greater than 10 km from the cabled ocean observatory, and a fiber optic cable having a fiber optic extension module at each end, wherein the fiber optic extension modules are inductively coupled to the cabled ocean observatory and the removable sensor, respectively;

sending serial data from the sensor and across an inductive coupling to one of the fiber optic extension modules;

modulating an optical transceiver in the fiber optic extension module based on the sent data, wherein modulating includes operating a laser in the optical transceiver using an on-off keying protocol;

sending modulated optical signals across the fiber optic cable;

receiving and converting the modulated optical signal to serial data at the other fiber optic extension module; and sending the received serial data across the inductive coupling to the cabled ocean observatory.

18. The method for long-range underwater communication of claim 17, wherein the modulated optical signals comprise in-band data packets carried by a plurality of data channels in the fiber optic cable, and out-of-band control and time signals, transmitted separately from data packets, carried by one or more control and time channels in the fiber optical cable.

19. The method for long-range underwater communication of claim 18, wherein the modulated optical signals are utilized to provide distribution of the in-band data packets and the out-of-band control and time signals to a plurality of fiber optic extension modules.

20. The underwater communication network of claim 18, further comprising regulating flow of the out-of-band control and time signals across the one or more control and time channels.

21. The underwater communication network of claim 20, further comprising measuring transmission latency among the plurality of fiber optic extension modules.

22. The underwater communication network of claim 18, further comprising selectively allowing a plurality of data channels internal to the fiber optic extension module to access the one or more control and time channels carrying the out-of-band control and time signals among a plurality of fiber optic extension modules.

23. The underwater communication network of claim 17, wherein each fiber optic extension module is reconfigurable without requiring a shutdown.

* * * * *